United States Patent [19]

Miknevich

[11] Patent Number: 5,302,291
[45] Date of Patent: Apr. 12, 1994

[54] METHOD FOR IMPROVING THE DISPERSIBILITY OF SOLVENT-BASED PAINTS IN AQUEOUS SYSTEMS

[75] Inventor: Joseph P. Miknevich, Coraopolis, Pa.

[73] Assignee: Calgon Corporation, Pittsburgh, Pa.

[21] Appl. No.: 954,451

[22] Filed: Sep. 30, 1992

[51] Int. Cl.$^5$ ................................ C02F 1/56
[52] U.S. Cl. .................. 210/696; 210/697; 210/698; 210/712; 210/727; 210/735; 210/930; 134/38
[58] Field of Search ............... 55/85; 210/696–701, 210/712, 725, 727, 728, 735, 930; 134/38; 427/331

[56] References Cited

U.S. PATENT DOCUMENTS

| | | | |
|---|---|---|---|
| 3,515,575 | 6/1970 | Arnold | 210/930 |
| 4,125,476 | 11/1978 | Dean | 252/115 |
| 4,130,674 | 12/1978 | Roberts et al. | 134/38 |
| 4,185,970 | 1/1980 | Dean | 55/89 |
| 4,440,647 | 4/1984 | Puchalski | 210/712 |
| 4,472,284 | 9/1984 | Bolhofner | 210/708 |
| 4,629,572 | 12/1986 | Leitz et al. | 210/714 |
| 4,656,059 | 4/1987 | Mizuno et al. | 210/735 |

FOREIGN PATENT DOCUMENTS

| | | |
|---|---|---|
| 293129 | 11/1988 | European Pat. Off. |
| WO911311 | 8/1991 | PCT Int'l Appl. ............ 210/930 |

OTHER PUBLICATIONS

Kirk–Othmer Encylcopedia of Chemical Technology, Third Edition, vol. 5, pp. 339–368.

*Primary Examiner*—Peter A. Hruskoci
*Attorney, Agent, or Firm*—W. C. Mitchell; C. G. Cochenour

[57] ABSTRACT

A method for improving the dispersibility of oversprayed, solvent-based paints in aqueous systems which comprises adding an effective amount of a chelating agent to an aqueous system containing solvent-based paints, particularly in high-hardness waters.

6 Claims, No Drawings

METHOD FOR IMPROVING THE DISPERSIBILITY OF SOLVENT-BASED PAINTS IN AQUEOUS SYSTEMS

BACKGROUND OF THE INVENTION

Automobile bodies and many industrial and consumer articles are spray painted in enclosed areas called paint spray booths. The purposes of these booths are to contain any fumes or paint overspray, reduce the risk of contamination of the part being painted and protect the health of the workers at the site. Smaller booths may employ filters to remove the paint overspray from the air but larger systems usually use a recirculating water system for this purpose. In operation, the units to be painted generally pass through the work area of the booth. Air flow through the booth forces the paint overspray into intimate contact with the recirculating water, thereby effectively scrubbing the paint solids from the air into the water. This may occur by forcing the air through a water curtain, some type of water spray or a venturi scrubber. Irrespective of how it is done, the net effect is that oversprayed paint contacts and is captured by the recirculating water of the spray booth.

The amount of oversprayed paint contacting recirculating water in a paint spray booth may change depending on a number of variables, including plant or process shutdowns, the size and shape of the object being painted, the type of spray equipment used, the spraying and purge technique used, the water flow rate and the type of paint used. Even though improved coating methods have significantly reduced the amount of paint overspray, up to about 50% of the total paint sprayed may not reach the article being painted. As a result, significant concentrations of paint can build up in the system. Since the majority of paints used today must be baked at elevated temperatures in order to cure properly, this paint can remain tacky indefinitely. It may coalesce into a mass of sticky material that can plug pipes, fans and recirculation pumps. In this way it can significantly reduce scrubbing efficiency in the booth. This can lead to an air imbalance which would not only result in a poor paint finish but also allow hazardous paint emissions to be discharged into the air. These conditions may also result in serious safety hazards to paint spray booth personnel. Also, federal regulations now limit the amount of volatile organic compounds (i.e., vocs) that can be released at a given plant site. Organic solvent diluents used in solvent-based paint are a major source of vocs.

Other problems may also develop. For example, the tacky paint deposits are excellent food sources for bacteria and fungus growths. These in turn can cause odor problems and spot corrosion in the system. The paint solids left in the water remain sticky and can cause expensive separation and disposal problems.

These problems demonstrate the desirability of effectively treating paint spray booth water systems so as to minimize the deposition of sticky, oversprayed paint on critical operating parts of the system; to make the resulting sludge non-tacky and easy to remove; and to provide water of sufficient quality that it can be recirculated in the system.

As paint technology has advanced, so has the quality of chemical treatments used to detackify the paint and provide a manageable sludge. There are presently a large variety of programs available for this purpose. For example, the use of water soluble polymers in conjunction with amphoteric metal salts which form insoluble metal hydroxides at pH's > 7 represents one such treatment. The use of combinations of this type are described in the following U.S. Pat. Nos. 3,861,887 to Forney; 3,990,986 to Gabel et al; 4,002,490 to Michalski et al; 4,130,674 to Roberts et al; and 4,440,647 to Puchalski. Further, U.S. Pat. No. 4,637,824 to Pominville discloses the use of silicates and polydiallyldialkyl ammonium halides with amphoteric metal salts, and U.S. Pat. No. 4,853,132 to Merrell et al discloses the use of precipitates formed by the reaction of cationic polymers and salts of inorganic anions to detackify solvent based paints. Bentonite clays, aluminum salts and zinc salts have also been used with cationic polymers.

U.S. Pat. No. 4,656,059 to Mizuno et al relates to the use of melamine-aldehyde acid colloid solutions for treating paint in wet spray booths and U.S. Pat. No. 4,629,149 to Leitz et al relates to the use of urea or amino triazine-aldehyde condensation reaction products in combination with water swellable clays to treat paint spray booth wastes. EP 0293129 discloses the use of melamine formaldehyde-type acid colloids, in conjunction with an alkalinity source, to treat oversprayed solvent based paints in paint spray booths, and U.S. Pat. No. 4,935,149 discloses the use of formaldehyde scavenged melamine-formaldehyde polymers to treat paint spray booth waters. Copending application U.S. Ser. No. 588,997 relates to the use of melamine formaldehyde acid colloids in paint spray booths containing both water and solvent based paints.

None of these references, however, disclose or suggest the use of a chelating or sequestering agent to adjust the hardness of the recirculating water of a paint spray booth. The instant inventor has found the addition of such compounds to substantially improve the performance of paint spray booth treatment methods, particularly acid colloid-based methods, by increasing the dispersibility of solvent borne paints captured by paint spray booth waters.

SUMMARY OF THE INVENTION

More particularly, it has been discovered that chemical paint spray booth treatments, and in particular acid colloid spray booth treatments, generally only detackify the surface of a solvent-based paint droplet in the recirculating water of a paint spray booth. A substantial portion of each paint droplet therefore remains unaffected by the treatment. Anything that penetrates or ruptures the surface of a droplet is therefore capable of releasing sticky paint from the center. Assuming that the thickness of the detackified layer is roughly constant, it becomes apparent that the larger the size of the droplet, the easier it is to rupture its surface and the less effective the overall detackification program becomes. Conversely, as paint solids are more effectively dispersed and the average size of the paint droplets decreases, it becomes more difficult to rupture their surfaces, which means that the detackification program becomes more effective. Therefore, any additives which are capable of improving the dispersion of paint particles in the recirculating water phase will also improve the effectiveness of the detackification program.

Many modern paint spray booths utilize high energy venturi scrubbers to facilitate the transfer of oversprayed paint from the air phase to the water phase. The high mix energy of these systems improves scrubbing efficiency and also provides improved contact between the paint and detackification chemicals, which serves to mechanically disperse the paint and prevent the droplets from reagglomerating. Unfortunately, not every facility is equipped with these high energy systems. Even where high efficiency scrubbers are in use, the advent of new, high solids, solvent-based paints lessens the effectiveness of the mechanical dispersion that these systems provide.

Several attempts have been made to address these situations chemically with limited results. For example, previously cited U.S. Pat. No. 4,656,059 suggests the use of surface active agents to improve paint dispersibility and EP 0293129 discloses the use of selected alkalinity sources to achieve improved dispersion. Both of these methods were at least partially successful relative to the types of paint used at the time of the respective inventions. Unfortunately, in situations where the recirculating water contains substantial hardness or when any of a variety of the new generation of high solids, solvent-based paints are used, these methods are largely ineffective in providing adequate dispersion to effectively detackify the paint.

In an effort to remedy this problem, it has been discovered that the addition of at least one conventional chelant to recirculating paint spray booth water substantially improves the dispersibility of solvent-based paints therein, particularly high-solids solvent based paints, thereby improving the efficacy of paint spray booth detackification methods. While lowering the hardness via addition of a chelant is believed to be beneficial in any case, the improvement becomes more apparent in the presence of hardness levels above about 100 mg/L, and is particularly evident in the presence of high hardness levels, such as is found in the American mid-west where source water hardness levels of in excess of 500 are common. Thus, in its broadest sense, the instant invention is directed to a method for improving the performance of paint detackification treatment methods by increasing the dispersibility of solvent-based paints lacquers or enamels in paint spray booth recirculating water, particularly when the water contains substantial hardness, by the addition of an effective amount of a chelating agent to the recirculating water being treated. This novel method therefore comprises the step of adding an effective amount at least one chelant to the recirculating water of the paint spray booth, thereby facilitating and/or improving the dispersion of the solvent-based paint, lacquer or enamel captured therein and enhancing the detackification performance of an existing paint spray booth treatment method, particularly a method which relies upon an acid colloid such as a melamine formaldehyde acid colloid as the detackifier. While it is believed that the instant chelating agents complex with hardness, which causes improved dispersion of solvent-based paints in paint spray booth water, particularly when alkalinity is added in combination with an acid colloid, the inventor does not wish to be bound by a particular mechanism.

Aside from improving paint dispersion, the addition of at least one chelating agent tends to extend the range of water chemistry in which solvent-based paints can be effectively treated. This invention therefore makes existing treatment methods more versatile in dealing with pH and alkalinity fluctuations common in operating systems, and with the variations in hardness common in waters found in certain areas. In addition, paint spray booth systems with low mix energy which were previously deemed difficult or impossible to effectively treat can now be handled with a minimum of difficulty.

The term "solvent-based paints", as used herein, refers to all varieties of water-insoluble coatings applied in spraying operations, including but not limited to oil base paints, enamels, urethanes and lacquers. These products, if untreated, readily adhere to the walls of spray booth systems and to any other surfaces that they contact, such as the surfaces of water distribution piping, spray nozzles, and the like. As used herein, the terms "solvent-based paints" and "solvent-borne paints" are synonymous.

The term "high solids paint", as used herein, refers to paints in which the percent solids has been increased over that of paints commonly used in the 1970,s primarily by increasing the percentage of resin binder in the paint at the expense of solvent. Typically, these paints contain in excess of about 50% solids (weight basis), though the % solids may vary significantly from paint to paint.

A primary treatment objective relative to solvent-based paints concerns the tacky or adhesive nature of the over-sprayed coating material. Due to their hydrophobicity, solvent-based solids tend to coalesce and accumulate on the walls, ceilings and floors of spray areas and to clog water spray equipment, recirculating pumps and the like. Thus, the over-sprayed paint mist captured in the water system of a spray booth must be detackified, or "killed," to prevent adherence to the walls, piping, etc. of the spray booth system. Paint that sticks to spray booth surfaces usually cannot be easily removed from the equipment and tends to build up over time, thereby hampering spray booth efficacy.

Acid colloids are widely used to detackify or kill oversprayed solvent-based paints. This invention relates to a method for improving the effectiveness of paint spray booth treatments by adding an effective amount of a chelating agent to the recirculating water of a paint spray booth treating oversprayed solvent-based paint. The chelating agent improves the dispersibility of the paint particles, which improves detackification efficacy. The chelants also improve the range of operability of conventional acid colloid treatment programs relative to pH, alkalinity and hardness.

As used herein, the term "chelating agent" refers to any compound capable of solubilizing or complexing metal ions, particularly calcium and magnesium. As such, this term, as used herein, is synonymous with the terms "solubilizing agent", "sequestering agent" and "complexing agent" when such terms refer to the ability of a compound to solubilize or complex with metal ions or the ability of a compound to lower hardness in a given paint spray booth system.

As used herein, the term "acid colloid" includes, but is not limited to, any acidic colloidal suspension of a melamine, dycyandiamide or urea condensation product, alone or in combination, with one or more aldehydes. For example, acid colloids prepared using melamine and formaldehyde are suitable for use in this invention. Other suitable acid colloids include those formed by the addition of a highly charged cationic material to a silicate or a colloidal silica. Such acid colloids are well known in the art.

DETAILED DESCRIPTION OF THE INVENTION

Despite the previously mentioned prior art efforts, there remains a clear need in the art for a method to provide a consistently effective means of dispersing all types of solvent-borne paints in order to maximize the effectiveness of conventional detackification programs. In addition, the treatment ideally should allow the formation of a sludge that is high in solids and of low volume and the treatment should be easy to apply and control.

In one embodiment, the present invention is directed to a method for improving the efficacy of a solvent-based paint detackification method which comprises adding an effective amount of a chelating agent to water containing oversprayed solvent-based paint prior to detackification of said oversprayed paint.

In another embodiment, the present invention relates to an improved method for treating circulating paint spray booth water which contains hardness and which contains or which will contain over-sprayed solvent-based paint(s), wherein the improvement comprises treating hardness present in said water via the addition of an effective amount of a chelating agent, thereby improving the dispersibility of said solvent-based paint in said water.

The present invention also relates to a method for improving the dispersibility of oversprayed, solvent-based paint in the circulating water of a paint spray booth comprising adding to said water an effective amount, preferably at least about 0.1 mg/L, based on the weight of the water being treated, of a chelating agent to said water.

Further, in a method for treating the circulating water of a paint spray booth system used to capture over-sprayed, solvent-borne paint, wherein said circulating water contains hardness and wherein said method comprises adding an acid colloid for the purpose of killing or detackifying said over-sprayed, solvent-borne paint, alone or in combination with an alkalinity source, the instant invention relates to the improvement which comprises adding an effective amount of a chelating agent to said circulating water for the purpose of treating said hardness and improving the dispersibility of said solvent-based paint, thereby improving the efficacy of said acid colloid relative to the killing or detackification of said over-sprayed paint.

Still further, the instant invention is directed to a method for improving the efficacy of a melamine-formaldehyde-based paint spray booth treatment program wherein the circulating water of said paint spray booth is treated with a melamine formaldehyde-type polymer for the purpose of detackifying over-sprayed, solvent-based paint, which method comprises adding an effective amount of a chelating agent to said circulating water for the purpose of improving the dispersibility of said paint.

Additionally, the instant invention is directed to compositions which comprise a) the circulating water of a paint spray booth containing oversprayed solvent-based paint and hardness; and b) at least about 0.1 mg/L, based on the weight of said water, of a chelating agent. Optionally, these compositions may further comprise an acid colloid such as a melamine aldehyde acid colloid and an alkalinity agent.

In this invention, at least one chelating agent is added to recirculating paint spray booth water as a conditioner/softener. It is believed that the chelants complex, sequester and/or chelate hardness ions present in the spray booth water, thereby preventing such ions from interfering with the dispersion of solvent-based paint(s) in the system being treated. For a given system, a chelating agent will theoretically complex, sequester and/or chelate a stoichiometric amount of hardness present in the system being treated. Therefore, improved efficacy occurs to the extent that hardness interference is reduced. By tying-up hardness, systems thought to be untreatable can now be effectively handled The consumption of treatment chemicals such as alkalinity sources, if used, and acid colloids also generally decreases.

An effective amount of chelant should be used. As used herein, the term "effective amount" refers to that amount of chelant which improves the dispersibility of paint in the system being treated to the desired extent. Preferably, at least about 0.1 mg/L of a chelant is added, based on the weight of water in the system being treated.

Alternatively, the chelant can be added on a molar basis relative to hardness, so as to complex with a substantial amount of the hardness present. Preferably, a sufficient amount of a chelating agent is added to maintain hardness in the circulating system being treated below about 100 mg/L, as $CaCO_3$, more preferably to below about 40 mg/L.

While it is believed that virtually any chelating agent which substantially lowers the hardness of paint spray booth circulating waters can be used, examples of classes of chelants which are believed to provide the desired performance properties include, but are not limited to phosphonic acids, aminocarboxylic acids, hydroxycarboxylic acids, polyamines, aminoalcohols and polymeric chelants. Specific examples include, but are not limited to ethylenediaminetetraacetic acid (EDTA) and salts and derivatives thereof, nitrilotriacetic acid (NTA) and salts and derivatives thereof, diethylenetriamine pentacetic acid (DTPA) and salts and derivatives thereof, N-hydroxyethylethylene diaminetriacetic acid (HEDTA) and salts and derivatives thereof, tetraborates and triethylamine diamine.

In addition, various polyphosphates can be used. These phosphate compounds have the added benefit of providing excellent corrosion protection. The preferred phosphates are "molecularly dehydrated phosphates", by which is meant any phosphate which can be derived from a monobasic or dibasic orthophosphate or from orthophosphoric acid, or from a mixture of any two of these, by elimination of water of constitution therefrom. Examples of such phosphates include alkaline metal tripolyphosphates, pyrophosphates, and metaphosphates, which are often designated as hexametaphosphates.

While it is believed that any molecularly dehydrated phosphate may be employed, it is preferred to use those which have a molar ratio of alkaline metal to phosphorous methoxide from about 0.9:1 to about 2:1, the later being the alkaline metal pyrophosphate. While it is preferred to use the metaphosphates, pyrophosphates, or tripolyphosphates of sodium, because they are the least expensive and most readily available, it is also possible to use the molecularly dehydrated phosphates of other metals such as potassium, lithium, cesium, or rhobidium or the ammonium molecularly dehydrated phosphates, which in many instances are classified as being alkaline metal phosphates, or the alkaline earth metal molecularly dehydrated phosphates such as those having calcium, barium, or strontium, or mixtures of alkaline metal and alkaline earth molecularly dehydrated phosphates.

The most preferred water soluble phosphates are sodium hexametaphosphate (SHMP), such as "Calgon" which is available from Calgon Corporation, Pittsburgh, Pa., and which may be described as $1.1\ NaO_2:1\text{-}P_2O_5$; tetrasodium pyrophosphate (TSPP); and sodium tripolyphosphate (STP).

A preferred class of chelants for purposes of this invention includes EDTA and salts thereof, NTA and salts thereof and polyphosphates. Sodium salts are most preferred.

The chelant may be added in either solid or liquid form to the paint spray booth recirculating water before the introduction of oversprayed solvent-based paint. The chelant can be admitted to the paint spray booth system at any convenient location via any conventional method. Typical points of addition include sumps, upstream from the pumps or at any advantageous position along the circulating water system.

The chelant may be slug fed or continuously fed to the paint spray booth water system.

The effectiveness of a candidate chelant in dispersing solvent-based paint can be determined by a simple procedure. The procedure entails the use of a number of containers to which water (preferably system water) and optionally a known concentration of a standard alkalinity source have been added. Hardness of the samples is determined by conventional means and a measured amount of the chelant to be evaluated is added. After an appropriate equilibration period, the hardness of the sample is again measured to determine chelating capacity.

Typically, exceptional paint dispersion is obtained at a hardness of less than about 100 mg/L, preferably 40 mg/L as $CaCO_3$. The effectiveness of the chelating agent can be observed visually by adding a detackifier such as a melamine formaldehyde acid colloid to the container while stirring followed by an equivalent amount of the paint to be evaluated. After 30 seconds of vigorous stirring, the contents of the container are transferred to a transparent beaker and observed. A well dispersed paint will provide a uniform color to the water with no individual paint globules visible in the beaker. In addition, no paint globules will be found adhering to the walls of the original container. Any chelating agent which provides improved dispersion can be used in the instant method.

While the use of chelants is believed to improve the efficacy of virtually any solvent-based paint detackification method, they are particularly effective relative to acid colloid-based treatment programs Preferred acid colloids are polymers prepared from (a) a triazine such as melamine or a substituted melamine, dicyandiamide urea or combinations thereof; and (b) at least one compound described by the following formula:

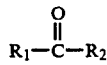

wherein $R_1$ and $R_2$, which may be the same or different, are selected from the group consisting of H and straight or branched $C_{1-4}$ alkyl groups. The preferred compounds of (b) compounds comprise aldehydes, with methanal (formaldehyde), ethanal and propanal being especially preferred; the most preferred aldehyde is formaldehyde. Such polymers may also include additional moieties, such as dicyandiamide or urea. However, nothing herein should be construed as limiting the term "acid colloid" to polymers which contain only (a) and (b). For example, the acid colloids counterplated herein include these formed by the addition of highly charged cationic material to silicate or a colloidal silica.

The preferred acid colloid polymers of the instant invention may be prepared by reacting the desired monomers according to standard condensation polymerization procedures. See, for example, U.S. Pat. No. 4,656,059. In general, such polymers are melamine-/aldehyde condensates wherein the melamine mer units may be replaced by other $NH_2$-reactive monomers, but wherein melamine is the dominant $NH_2$ source in the condensation reaction.

The mole ratio of component (a) to component (b) should generally range from about 1:1 to about 1:6, with the preferred ratio being from about 1:1 to about 1:3. The most preferred mole ratio is about 1 mole of melamine or a substituted melamine to about 2 to 2.5 moles of an aldehyde. Thus, the most preferred polymer is prepared by reacting melamine and formaldehyde with the mole ratio of melamine to formaldehyde being about 1:2 to about 1:2.5. Other compounds may also be reacted with the melamine and formaldehyde components to yield melamine polymers or melamine-aldehyde-type polymers which are, for example, terpolymers. Compounds containing $NH_2$ groups are preferred comonomers.

The instant melamine polymers are insoluble in water. They are therefore best utilized in acid solutions wherein the melamine polymer is stabilized in a fine colloidal state of suspension. Calgon's product CA 289, which has a pH of about 1.6 to about 2.1, is an example of the preferred form. This product contains about 8% active melamine-formaldehyde polymer in an acid aqueous solution. Any acid can be used to prepare the melamine aldehyde acid suspension, although hydrochloric acid is preferred. Also, other stabilizing agents, such as low molecular weight alcohols and glycols, can be used.

The percent, by weight, of active melamine polymer in a stabilized (acidic) suspension or solution should range from about 0.1% to about 20%, preferably 1% to about 15%, and most preferably about 4% to about 12%, due to cost and product stability considerations. The pH should be sufficiently low to keep the melamine formaldehyde-type polymer in a fine colloidal suspension.

The molecular weight of the melamine formaldehyde-type polymer is not critical. However., the preferred molecular weight generally ranges from about 500 to about 50,000, and the most preferred molecular weight ranges from about 500 to about 5,000. As noted above, suitable melamine formaldehyde-type polymers are commercially available from Calgon Corporation, under the tradenames CA-289, WR-2511 and PK-9511. These products have molecular weights of about 2,200.

An effective amount of the acid colloid polymer should be added to or maintained in the water being treated. Relative to the acid colloid, the term "effective amount" refers to that amount of melamine polymer which achieves the desired detackification of solventborne paint in the system being treated.

The melamine polymer can be applied intermittently or continuously to the water system being treated at a preferred dosage of from between about 0.001 to about 1.0 part melamine polymer (active basis) per part paint, most preferably between about 0.01 and about 0.5 part active melamine polymer per part paint. Since spraying is generally continuous, continuous addition of the melamine polymer is preferred. For solvent-borne paints, the melamine polymer must be added prior to contact between live paint and recirculating paint spray booth water. The polymer can be added at any convenient location, but is preferably added so as to allow the maximum concentration of the melamine polymer to contact the over-sprayed paints. For combined water and solvent-borne systems, it is desirable to add an effective portion of the melamine polymer after contact between live paint and the circulating water.

In a typical paint spray booth operation, the return water from the booth generally encounters extreme turbulence. This turbulence improves the efficacy of the treatment by promoting intimate contact between the paint and the melamine polymer. The chelant is preferably added via any suitable means to an area of high energy prior to the booth.

In a melamine aldehyde acid colloid-based treatment method, before the over-sprayed, solvent-based paint contacts paint spray booth water, the alkalinity of the water in the paint spray booth system is preferably adjusted to maintain a minimum alkalinity of about 50 ppm (as $CaCO_3$) to a maximum alkalinity of about 2000 ppm. Preferably, the alkalinity should be maintained between about 100 and about 1000 ppm (as $CaCO_3$). If sufficient alkalinity is not present (i.e., below about 50 ppm), the acid colloid treatment is generally not as effective, resulting in poor collection efficiency and poor detackification of the solvent-based paint. Additionally, the pH of the water being treated should be maintained between about 6.0 and about 9.0, preferably between about 6.5 and 8.0. It is believed that the type of acid or base used to adjust and maintain pH is not critical and that any acid or base can therefore be used. Acids and bases such as sulfuric acid and caustic, respectively, are generally used to adjust pH, if pH adjustment is necessary. A pH of at least about 6.0 is desirable in order to activate the melamine polymer. As the pH is lowered below about 6.0, corrosion in the system generally increases. On the other hand, a pH of greater than about 9.0 generally is expensive to maintain and facilitates foam generation and hinders solids capture.

Any alkalinity source can be used. For example, alkalinity can be added in the form of alkali metal carbonates or alkali metal bicarbonates such as sodium carbonate or sodium bicarbonate, or as NaOH, KOH, silicates and/or blends thereof. The preferred alkalinity sources are sodium carbonate or sodium bicarbonate. These alkalinity sources are generally inexpensive and safe to use.

The alkalinity should be maintained so that the circulating water which contacts the over-sprayed paint or paints being treated is in the designated alkalinity range. Any method of adding the source of alkalinity can be used, including batch or continuous addition, though continuous addition is preferred.

In acid colloid treatment methods, an effective amount of a polymeric flocculant is generally added to the paint spray booth water system. Relative to the flocculant, the term "effective amount" refers to that amount of flocculant necessary to promote the formation of a buoyant floc structure by binding the conditioned paint particles and incorporating air into the floc structure. The resulting floating floc facilitates the removal of paint solids from the circulating water system. The paint sludge generated from co-addition of a polymeric flocculant and an acid colloid should provide desirable handling and dewatering properties.

The type of polymeric flocculant used and its molecular weight are not believed to be critical to the detackification process. Suitable flocculants include cationic polymers, nonionic polymers, anionic polymers, amphoteric polymers, or mixtures thereof.

Examples of acceptable flocculants include long chain polyacrylamides and long chain polymethacrylamides; the preferred flocculants are nonionic or slightly anionic polyacrylamides having a weight average molecular weight ranging from about $6 \times 10^6$ to about $20 \times 10^6$.

Typical cationic polyelectrolytes which may be used as flocculants in the instant invention include but are not limited to polyamines, polyphosphonium compounds, polysulfonium compounds, quaternary ammonium compounds, polymers of methacryloyloxyethyl trimethyl ammonium methyl sulfate (METAMS), polymers of methacrylamido propyl trimethyl ammonium chloride (MAPTAC), polymers of acryloyloxyethyl trimethyl ammonium chloride (AETAC), polymers of methacryloyloxyethyl trimethyl ammonium chloride (METAC) and polymers prepared from combinations of METAMS, MAPTAC, AETAC and/or METAC with acrylamide and/or methacrylamide. Representative of quaternary ammonium compounds are diethyl diallyl ammonium and dimethyl diallyl ammonium polymers and salts thereof.

The preferred cationic flocculants are quaternary ammonium polymers such as polydimethyl diallyl ammonium chloride (polyDMDAAC), poly dimethyl diallyl ammonium bromide (polyDMDAAB), poly diethyl diallyl ammonium chloride (polyDEDAAB), or any of the same copolymerized with acrylamide or methacrylamide. The preferred molecular weights for the quaternary ammonium polymers are in excess of about 2,000,000.

The most preferred cationic flocculant is a polymer comprising dimethyl diallyl ammonium chloride and acrylamide, or a homologue thereof, having a weight average molecular weight in excess of about 4,000,000. The ratio of the nonionic moiety (for example, acrylamide or methacrylamide) to the cationic moiety should be greater than about 1:1, on an active weight basis.

Other preferred polymers comprise: a) acrylamide or methacrylamide and b) METAMS, METAC, MAPTAC or AETAC, wherein the monomer ratio of a):b), on an active weight basis, is greater than about 1:1.

The preferred anionic polyelectrolytes possess a low charge (i.e., less than 10%) and are selected from the group consisting of polyacrylic acids and salts thereof, particularly sodium salts thereof, having a molecular weight ranging from about $2 \times 10^6$ to about $20 \times 10^6$, and polymers comprising a) acrylic acid or methacrylic acid and b) 2-acrylamido-2-methylpropylsulfonic acid and/or 2-methacrylamido-2-methylpropylsulfonic acid, wherein the weight ratio of a):b) ranges from about 1:99 to about 99:1, preferably 10:90 to 90"10 and most preferably 75:25, and wherein the molecular weight ranges from about $2 \times 10^6$ to about $20 \times 10^6$.

High molecular weight polyampholytes can be used in the instant method. Representative examples of suitable polyampholytes include polymers comprising a) acrylic acid, methacrylic acid, 2-acrylamido-2-methylpropylsulfonic acid or 2-methacrylamido-2-methylpropylsulfonic acid, alone or in combination, and b) dimethyl diallyl ammonium chloride, dimethyl diallyl ammonium bromide, diethyl diallyl ammonium chloride or diethyl diallyl ammonium bromide, alone or in combination, wherein the weight ratio of component a) to component b) ranges from about 90:10 to about 10:90 and wherein the polyampholyte has a molecular weight in excess of about $2 \times 10^6$. The polyampholytes may also contain nonionic moieties such as acrylamide or methacrylamide.

Blends of the above listed nonionic, cationic, anionic and polyampholyte flocculants can be used, alone or in combination with amphoteric metal salts.

An effective amount of the polymeric flocculant should be added. The effective amount for a given system generally depends upon the quantity of melamine aldehyde-type-polymer present in the system being treated. Preferably, the effective flocculant dosage will range from about 0.01 to about 150 parts (active basis) of the polymeric flocculant per part melamine aldehyde-type polymer (active basis). In this range, the use of an appropriate polymeric flocculant forms a well conditioned, easily-captured floc, and in addition it may reduce or totally eliminate foam formation in the system by removing colloidal particulates present in the water.

After contacting the acid colloid polymer-treated paint solids with at least one polymer flocculant, the sludge is removed from the water. This removal may be facilitated by any means known in the art, including but not limited to air flotation and filtration.

EXAMPLES

The following examples further demonstrate the present invention. They should not be construed as limiting the scope of the invention in any way.

EXAMPLE 1-21

A standard jar test procedure was used to determine the efficacy of various chelants on a given system.

The general procedure involved adding 200 mls of system makeup water to a 500 ml glass jar. The initial hardness of the water was determined and a measured amount of chelant was added, based on the initial hardness. The combination was mixed for one minute at high speed on a magnetic stirrer to dissolve the chelant and to allow for complexation with hardness. At the end of this time the hardness of the water was again measured.

One half (0.5) ml of PaintKill® 9511 (a melamine aldehyde acid colloid detackifier commercially available from Calgon Corporation) was added with stirring followed immediately by one half (0.5) ml of the paint to be evaluated. This composition was then mixed at high speed for 30 seconds using a magnetic stirrer, after which time the contents were poured into a 200 ml clear container. Effectiveness of chelant relative to dispersion is readily discernible to the naked eye. A well dispersed paint will produce a uniform, fine grained floc the same color as the paint being treated with no globules of paint evident and no sticky material adhering to the walls of the jar while a poorly dispersed one will show well defined globules randomly scattered in a translucent floc. In addition, globules of material will be found adhering to the walls of the jar.

A wooden tongue depressor can also be used to determine finer differences in the degree of dispersion (and consequently detackification performance) using the criteria defined in U.S. Pat. No. 4,853,132 to Merrell et al. These guidelines are shown in Table I below.

To demonstrate the utility of the treatment a series of jar tests were conducted on a mixed, high solids, solvent-based topcoat from Toyota, Georgetown, Ky. Results are illustrated in Tables II and III, below.

In Tables II and III:

$Na_4$ EDTA is sodium salt of ethylene diaminetetraacetic acid;

SHMP is sodium hexametaphosphate;

DTPA is diethylenetriaminepentaacetic acid;

HEDTA is hydroxyethylethlenediaminetriacetic acid;

TSPP is sodium tripolyphosphate; and

NTA is nitrilotriacetic acid.

TABLE I

DETACKIFICATION/DISPERSIONS GUIDELINES

| Rating | Definition |
|---|---|
| Fail | Paint forms large tacky globules and/or coating which adheres to the exposed surfaces of the jar and tongue depressor. |
| Poor | Paint forms agglomerates which are slightly tacky or smeary to touch, or upon crushing. Paint sludge coats the tongue depressor. |
| Fair | Paint forms granular flocs or globules which adhere to less than 10% of the exposed surface area of the jar or depressor. Sludge may be smeary, but not tacky. |
| Good | Paint forms particles or globules, some of which appear as specks on less than 1% of the exposed surface area of the jar or depressor. Sludge is neither smeary nor tacky. |
| Excellent | Paint forms particles which do not adhere to the exposed surfaces of the jar or depressor. The paint sludge may float, sink, or be dispersed in the water. |

TABLE II

EFFECT OF VARIOUS CHELANTS ON DETACKIFICATION

| Example # | Chelant Active (ppm) | Hardness as CaCO$_3$ | Dispersion/ Detack | Comments |
|---|---|---|---|---|
| 1 | — | 188 | Fail | Lg. globules coat jar and depressor |
| 2 | Na$_4$EDTA 500 | 32 | Excellent | Completely dispersed |
| 3 | SHMP 500 | 30 | Excellent | Completely dispersed |
| 4 | Na$_4$P$_2$O$_7$ 500 | 38 | Excellent | Completely dispersed |
| 5 | DTPA 500 | 30 | Excellent | Completely dispersed |
| 6 | HEDTA 500 | 36 | Excellent | Completely dispersed |
| 7 | TSPP 500 | 40 | Excellent | Completely dispersed |
| 8 | NTA (excess) | — | Excellent | Completely dispersed |
| 9 | Na$_2$B$_4$O$_7$ (excess) | — | Excellent | Completely dispersed |
| 10 | Tri-ethyl-amine diamine (excess) | — | Excellent | Completely dispersed |

TABLE III

EFFECT OF CHELANT CONCENTRATION ON PAINT DETACKIFICATION

| Ex. No. | Alka. (1000 ppm) | Hardness (as CaCO$_3$) | Chelant (ppm) | Disp/ Detack | Comments |
|---|---|---|---|---|---|
| 11 | Na$_2$CO$_3$ | 188 | — | Poor | Visible globules, smeary to the touch. |
| 12 | KOH | 188 | — | Fail | Lg. globules, coat jar and depressor |
| 13 | Na$_2$Si$_3$ | 188 | — | Fail | Same as #12 |
| 14 | Na$_2$CO$_3$ | 150 | Na$_4$EDTA | Poor | Smaller globs than #11. Small amount on stirrer and depressor. |
| 15 | Na$_2$CO$_3$ | 125 | Na$_4$EDTA 200 | Fair | More uniform dispersion but globs still present. Some on depressor. |
| 16 | Na$_2$CO$_3$ | 95 | Na$_4$EDTA 300 | Fair/ Good | Some globules present |
| 17 | Na$_2$CO$_3$ | 62 | Na$_4$EDTA 400 | Good | V. sm. amount on depressor. None on jar. |
| 18 | Na$_2$CO$_3$ 500 | 32 | Na$_4$EDTA 500 | Excellent | Completely dispersed. |
| 19 | Na$_2$CO$_3$ 450 | 48 | Na$_4$EDTA 450 | Good/ Excellent | Few specks on depressor non on jar. Lg. globules, coat jar, depressor. |
| 20 | Na$_2$CO$_3$ 500 ppm | 190 | — | Fail | Lg. globules, coat jar, depressor. |
| 21 | Na$_2$CO$_3$ 500 ppm | 45 | Na$_4$EDTA 500 | Excellent | Completely dispersed. |

What is claimed is:

1. A method for improving the dispersibility of over-sprayed, solvent-based paint in the circulating water of a paint spray treated with an acid colloid detackifier which is a melamine condensation product with formaldehyde, wherein said paint is a high solids paint containing in excess of about 50% solids, and said water contains hardness, as calcium carbonate, in excess of about 100 mg/L based on the weight of said water, comprising adding to said water an effective amount of a chelating agent selected from the group consisting of ethylenediaminetetraacetic acid or salts or derivatives thereof, diethylenetriaminepentaacetic acid or salts or derivatives thereof, N-hydroxyethylethylene diaminetriacetic acid or salts or derivatives thereof, nitrolotriacetic acid or salts or derivatives thereof, phosphates, triethylaminediamine, and tetraborates, to maintain said hardness in said circulating water below about 100 mg/L.

2. The method of claim 1, wherein said chelating agent is selected from the group consisting of ethylenediaminetetraacetic acid or salts or derivatives thereof, diethyleneaminepentaacetic acid or salts or derivatives thereof, N-hydroxyethylethylenediaminetriacetic acid or salts or derivatives thereof, phosphates, triethylaminediamine and tetraborates.

3. The method of claim 1, wherein at least about 0.1 mg/L of said chelant is added.

4. In a method for treating the circulating water of a paint spray booth system used to capture over-sprayed, solvent-borne paint, wherein said circulating water contains hardness, as calcium carbonate, in excess of about 100 mg/L based on the weight of said water, and said paint is a high solids paint containing in excess of about 50% solids, and wherein said method comprises adding a melamine formaldehyde acid colloid detackifier for the purpose of killing or detackifying said over-sprayed, solvent-borne paint, alone or in combination with an alkalinity source, the improvement which comprises adding an effective amount of a chelating agent to said circulating water for the purpose of treating said hardness and improving the dispersibility of said solvent-based paint, thereby improving the efficacy of said melamine formaldehyde acid colloid detackifier relative to the killing or detackification of said over-sprayed paint, wherein said chelating agent is selected from the group consisting of ethylenediaminetetraacetic acid or salts or derivatives thereof, diethylenetriaminepentaacetic acid or salts or derivatives thereof, N-hydroxyethylethylene diaminetriacetic acid or salts or derivatives thereof, phosphates, triethylaminediamine, and tetraborates, to maintain said hardness in said circulating water below about 100 mg/L.

5. The method of claim 4, wherein said chelating agent is selected from the group consisting of ethylenediaminetetraacetic acid or salts or derivatives thereof, diethyleneaminepentaacetic acid or salts or derivatives thereof, N-hydroxyethylenethylenediaminetriacetic acid or salts or derivatives thereof, phosphates, triethylaminediamine and tetraborates.

6. The method of claim 4, wherein at least about 0.1 mg/L of said chelant is added.

* * * * *